(12) United States Patent
Tweedy et al.

(10) Patent No.: US 6,650,418 B2
(45) Date of Patent: *Nov. 18, 2003

(54) HIGH PERFORMANCE FIBER OPTIC ACCELEROMETER

(75) Inventors: Michael J. Tweedy, Simi Valley, CA (US); Eric L. Goldner, Valencia, CA (US); Patrick J. Welton, Thousand Oaks, CA (US); Gregory M. Nau, Alexandria, VA (US); Bruce A Danver, Alexandria, VA (US)

(73) Assignee: Litton Systems, Inc., Woodland Hills, CA (US)

(*) Notice: Subject to any disclaimer, the term of this patent is extended or adjusted under 35 U.S.C. 154(b) by 49 days.

This patent is subject to a terminal disclaimer.

(21) Appl. No.: 09/916,615

(22) Filed: Jul. 27, 2001

(65) Prior Publication Data

US 2003/0020919 A1 Jan. 30, 2003

(51) Int. Cl.[7] .............................................. G01B 9/02
(52) U.S. Cl. ..................................................... 356/477
(58) Field of Search ....................... 356/477; 73/514.26, 73/514.27; 250/227.19

(56) References Cited

U.S. PATENT DOCUMENTS

| | | | | |
|---|---|---|---|---|
| 4,226,120 A | * | 10/1980 | Nissl ........................ | 73/514.26 |
| 4,322,829 A | | 3/1982 | Davis, Jr. et al. | |
| 4,829,821 A | * | 5/1989 | Carome .................... | 73/514.09 |
| 4,893,930 A | * | 1/1990 | Garrett et al. ............. | 356/477 |
| 4,959,539 A | * | 9/1990 | Hofler et al. .......... | 250/227.19 |
| 5,134,882 A | * | 8/1992 | Taylor ..................... | 73/514.26 |
| 5,276,322 A | * | 1/1994 | Carome ................. | 250/227.21 |
| 5,285,424 A | * | 2/1994 | Meyer ........................ | 367/149 |
| 5,317,929 A | * | 6/1994 | Brown et al. ............ | 73/514.01 |
| 5,369,485 A | | 11/1994 | Hofler et al. | |
| 5,705,809 A | * | 1/1998 | Kershaw ................ | 250/227.14 |
| 5,883,308 A | * | 3/1999 | Fersht ..................... | 73/514.26 |
| 5,903,349 A | | 5/1999 | Vohra et al. | |
| 6,377,352 B1 | * | 4/2002 | Coronato et al. .......... | 356/460 |
| 6,384,919 B1 | * | 5/2002 | Fersht et al. .............. | 356/477 |
| 6,473,183 B1 | * | 10/2002 | Tweedy et al. ............. | 356/477 |

* cited by examiner

Primary Examiner—Robert H. Kim
Assistant Examiner—Thomas R Artman
(74) Attorney, Agent, or Firm—Lynn & Lynn

(57) ABSTRACT

A pair of fiber optic coils are mounted on opposite sides of a flexural disk and are arranged to form an interferometer that produces an output signal in response to acceleration of the flexural disk. The flexural disk is mounted in a housing having first and second end plates with a sidewall extending between them. A support member extends between the end plates and through a central passage in the flexural disk. A pair of compressive dampers is mounted in the housing between the flexural disk and the housing end plates. A shear damper mounted on the central support member exerts a radial force on an inner edge of the central passage in flexural disk to dampen vibrations of the flexural member and control the output signal amplitude over a selected frequency range.

27 Claims, 5 Drawing Sheets

HIGH PERFORMANCE FIBER OPTIC ACCELEROMETER

STATEMENT OF GOVERNMENT RIGHTS

The United States government has rights in this invention under contract N00024-99-C-6332.

BACKGROUND OF THE INVENTION

This invention relates generally to a fiber optic sensor that includes a pair of multiple layer spiral-wound optical fiber coils on opposite sides of a flexural disk with the optical fiber coils being included in an interferometer. This invention particularly relates to sonar arrays suitable for mounting on a ship or submarine hull.

SUMMARY OF THE INVENTION

The present invention overcomes the deficiencies of the prior art in a low-cost assembly. This invention is directed to a fiber optic sensor that includes a flexural disk having a pair of fiber optic coils mounted on opposite sides thereof and optically coupled together to form an interferometer that produces an output signal in response to acceleration of the flexural disk. The invention includes a housing having first and second end plates with a sidewall extending between the end plates. The sidewall has an inwardly facing groove in which an outer edge portion of the flexural disk is mounted. A compressive damper is mounted in the housing and arranged to exert a compressive force on the flexural disk to control movement thereof in response to acceleration of the flexural disk along a sensing axis and thereby control the output signal.

The compressive damper preferably comprises a pair of compressive damping members mounted between opposite sides of the flexural disk and the end plates.

The invention preferably further comprises a support member extending between oppositely facing portions of the first and second end plates. Each of the first and second compressive damping members preferably comprises a cylinder formed of a viscoelastic material such as Sorbothane® having a central passage therein with the first and second damping members being mounted in the housing such that the support member extends through the central passages in the first and second compressive damping members.

The end plates of the housing preferably have ribbed inner surfaces arranged so that a plurality of ribs extends away from the end plates inward toward the first and second compressive damping members with the first and second compressive damping members being compressed between the ribs of the opposite end plates. The ribs preferably are arranged to extend radially between the support member and the sidewall of the housing. An adjacent pair of the ribs in one of the end plates preferably has slots formed therein for mounting an optical coupler in the housing.

The housing preferably comprises a plurality of routing tabs extending inward from the sidewall for retaining optical fibers in selected positions in the housing.

The flexural disk includes a central passage therethrough and the invention preferably includes a central support extending through the central passage in the flexural disk with an inner edge of the central passage in the flexural disk being spaced apart from the support member. The invention may further comprise a shear damper mounted on the central support member and arranged to exert a radial force on the inner edge of the flexural disk to dampen vibrations of the flexural member and thereby further control the output signal amplitude. The shear damper preferably comprises a length of tubing formed of a viscoelastic material such as nitrile, polyurethane or silicone rubber. The central support preferably includes a circumferential slot in which the shear damper is mounted.

DETAILED DESCRIPTION OF THE INVENTION

Figure 1:
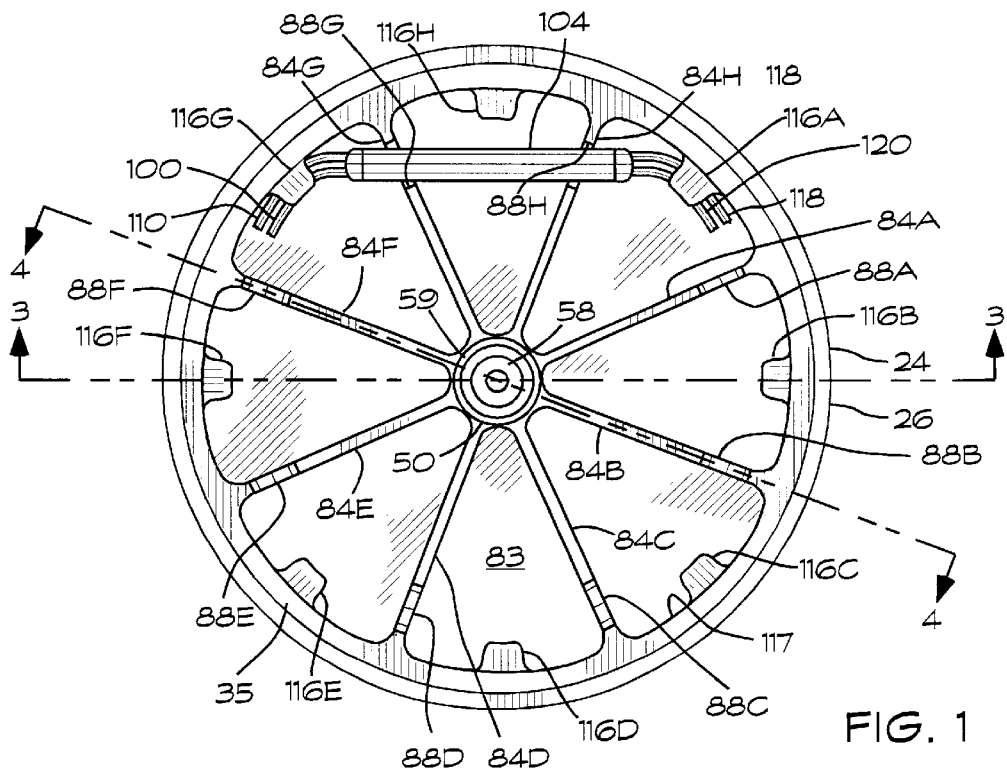
FIG. 1 is a top plan view of a portion of a housing that may be included in the invention.

A fiber optic sensor 10 according to the invention includes a housing 24 as shown in FIGS. 1–4. FIG. 1 is a top plan view of a first section 26 of the housing 24. The cross sectional views of FIGS. 3 and 4 should be viewed with FIGS. 1 and 2 to facilitate an understanding of the structure of the invention.

Figure 3:
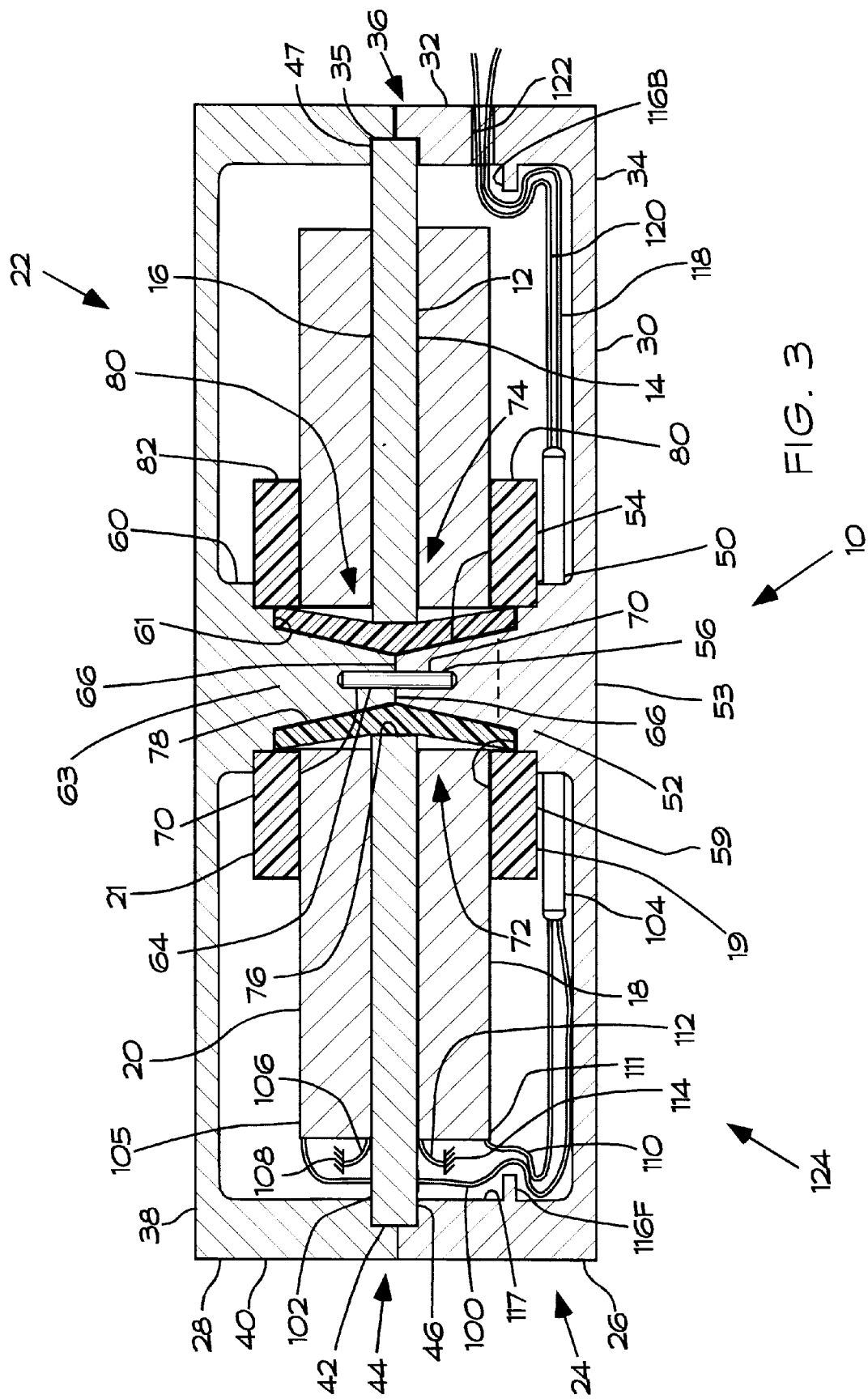
FIG. 3 is a cross sectional view of a fiber optic sensor according to the present invention taken along line 3—3 of the housing portion of FIG. 1.
Figure 4:
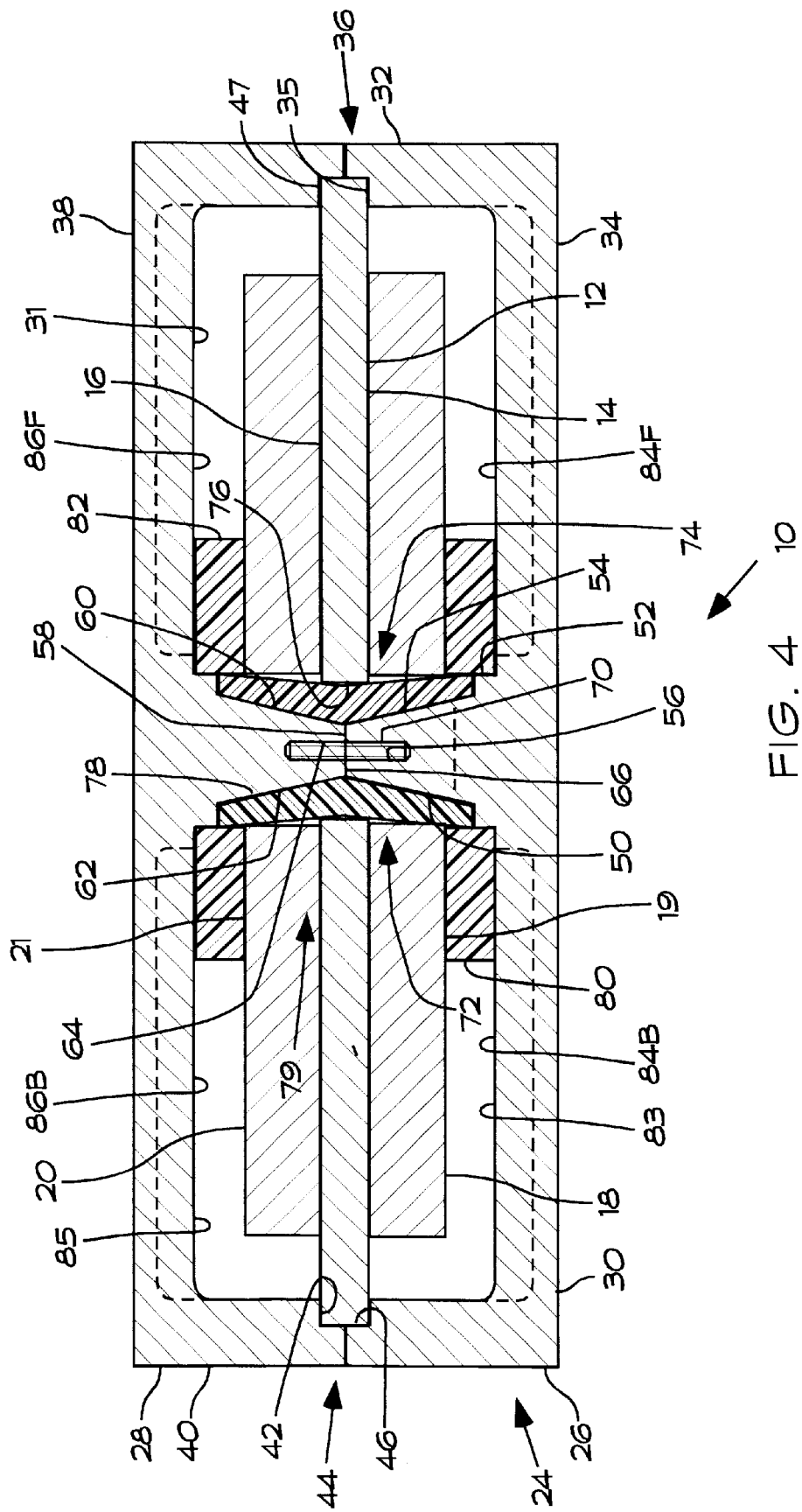
FIG. 4 is a cross sectional view of a fiber optic sensor according to the present invention taken along line 4—4 of the housing portion of FIG. 1.

As shown in FIGS. 3 and 4, the fiber optic sensor 10 includes a flexural disk 12 having first and second sides 14 and 16, respectively. A first fiber optic coil 18 is connected to the first side 14 of the flexural disk 12. A second fiber optic coil 20 is connected to the second side 16 of the flexural disk 12. For simplicity of illustration, the first and second fiber optic coils 18 and 20, respectively, are indicated as thick-walled hollow cylinders. However, it should be understood that the first and second fiber optic coils 18 and 20, respectively, are multi-layer, spiral-wound coils that may be formed in accordance with well-known techniques for forming such coils.

The flexural disk 12 is preferably formed of a structural material such as aluminum. Other materials, such as polycarbonate, may be used to form the flexural disk 12, depending on the operational spectral range of the fiber optic sensor 10. The flexural disk 12 and the first and second fiber optic coils 18 and 20 comprise a flexural disk assembly 22 that is the primary transducer for the fiber optic sensor 10.

The flexural disk assembly 22 is mounted inside a housing 24 as shown in FIGS. 3 and 4. The housing 24 comprises the first housing member 26 and a second housing member 28. Except as noted herein, the first and second housing members 26 and 28, respectively, are preferably essentially identical. The first housing member 26 preferably includes an end plate 30 that preferably is formed as a thin cylinder. A sidewall 32 that is preferably formed as a hollow cylinder extends from an outer edge portion 34 of the end plate 30.

As shown in FIGS. 1–4, the sidewall 32 has a stepped inner diameter such that a notch 35 is formed at an end edge portion 36 of the sidewall 32. The second housing member 28 has an end plate 38 and a sidewall 40. Referring to FIGS. 3 and 4, a notch 42 is formed at an end edge portion 44 of the sidewall 40. When the first and second housing members 26 and 28 are placed together end-to-end, the notches 35 and 42 cooperate to form a groove 46 that faces inward in the housing 24. When the fiber optic sensor 10 is assembled, an outer edge portion 47 of the flexural disk 12 is retained in the groove 46.

The first housing member 26 further includes a post 50 as shown in FIGS. 1–4. The post 50 has a base portion 52 that is preferably formed as a cylinder that extends perpendicularly out from a central region 53 of the end plate 30. A cylindrical recess 56 may be formed in an end face 58 of an end portion 54 of the post 50. The post 50 further preferably includes a diametral step 59 where the post 50 transitions from the cylindrical base 52 to the end portion 54. The end potion 54 may be formed as a frustocone such that it has a diametral taper that decreases from the step 59 toward the end face 58.

The second housing member 28 includes a post 60 that has an end portion 62 that is tapered like the end portion 54 of the post 50. A cylindrical recess 64 is formed in an end face 66 of the post 60. The post 60 further preferably includes a diametral step 61 where the post 60 transitions from a cylindrical base 63 to the end portion 62.

When the fiber optic sensor 10 is assembled, a structural adhesive such as epoxy is applied between the end faces 58 and 66 with a dowel pin 70 being inserted in the recesses 56 and 62 to provide the dual functions of aligning the upper and lower posts 50 and 60, respectively, and providing an additional retention force as well.

Still referring to FIG. 3 and 4, the posts 50 and 60 and the dowel pin 70 cooperate to form a support member 72 for the flexural disk 12. The support member 72 extends through a central passage 74 in the flexural disk 12. The central passage 74 has a diameter that is larger than the diameter of a central region 79 of the support member 72 so that an inner edge portion 76 of the flexural disk 12 is spaced apart from the central support member 72.

A shear damper 78 is placed between the inner edge portion 76 of the flexural disk 12 and the central region 79 of the support member 72. The tapered shapes of the end portions 54 and 62 make the central region 79 have a circumference that increases in each direction away from the end faces 58 and 66. The shear damper 78 has a thickness such that the inner edge portion 76 of flexural disk 12 fits firmly against the shear damper 78. The shear damper 78 may be formed of a selected length of tubing formed of a suitable material. The shear damper 78 preferably is comprised of a viscoelastic material such as nitrile, silicone, butyl or polyurethane rubber.

The sensor 10 further includes a pair of compressive dampers 80 and 82 mounted on the posts 50 and 60. The compressive dampers 80 and 82 are preferably constructed of a soft viscoelastic damping material (such as Sorbothane®) and formed as hollow cylinders having wall widths that are arranged to cover about 25% to 50% of inner portions 19 and 21 of the fiber optic coils 18 and 20, respectively.

Figure 2:
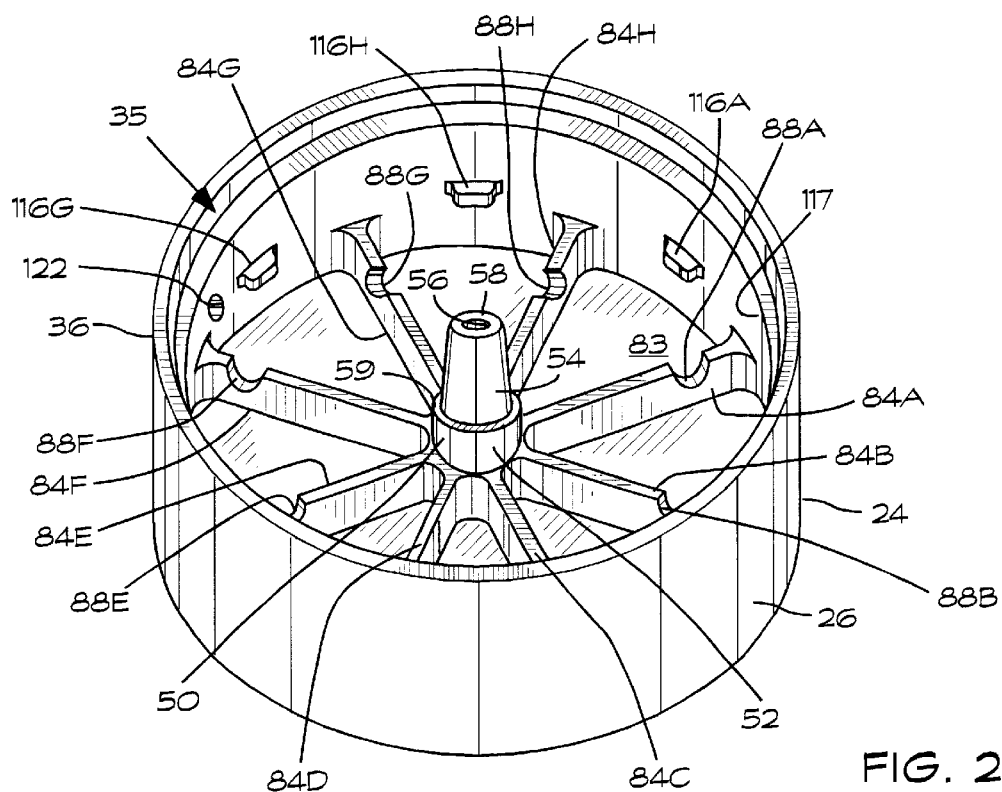
FIG. 2 is a perspective view of the housing portion of FIG. 1.

Referring to FIGS. 1, 2 and 4, the end plate 30 of the first housing member 26 has a ribbed inner surface 83 that includes a plurality of ribs 84A–84H that extend radially between the post 50 and the sidewall 32. The end plate 38 of housing member 28 has an inner surface 85 that is ribbed in a manner substantially identical to that of the inner surface 83 of the first housing member 26. The cross sectional view of FIG. 4 shows only two of the ribs 86B and 86F that are formed in the end plate 38.

When the fiber optic sensor 10 is fully assembled, the compressive damper 80 is compressed between the ribs 84A–84H and an inner portion 19 of the fiber optic coil 18 that is adjacent the compressive damper 80. Likewise, the compressive damper 82 is compressed between the ribbed inner side 85 of the end plate 38 and an inner portion 21 of the fiber optic coil 20. FIG. 4 shows the ribs 86B and 86F adjacent the compressive damper 82.

Figure 5A:
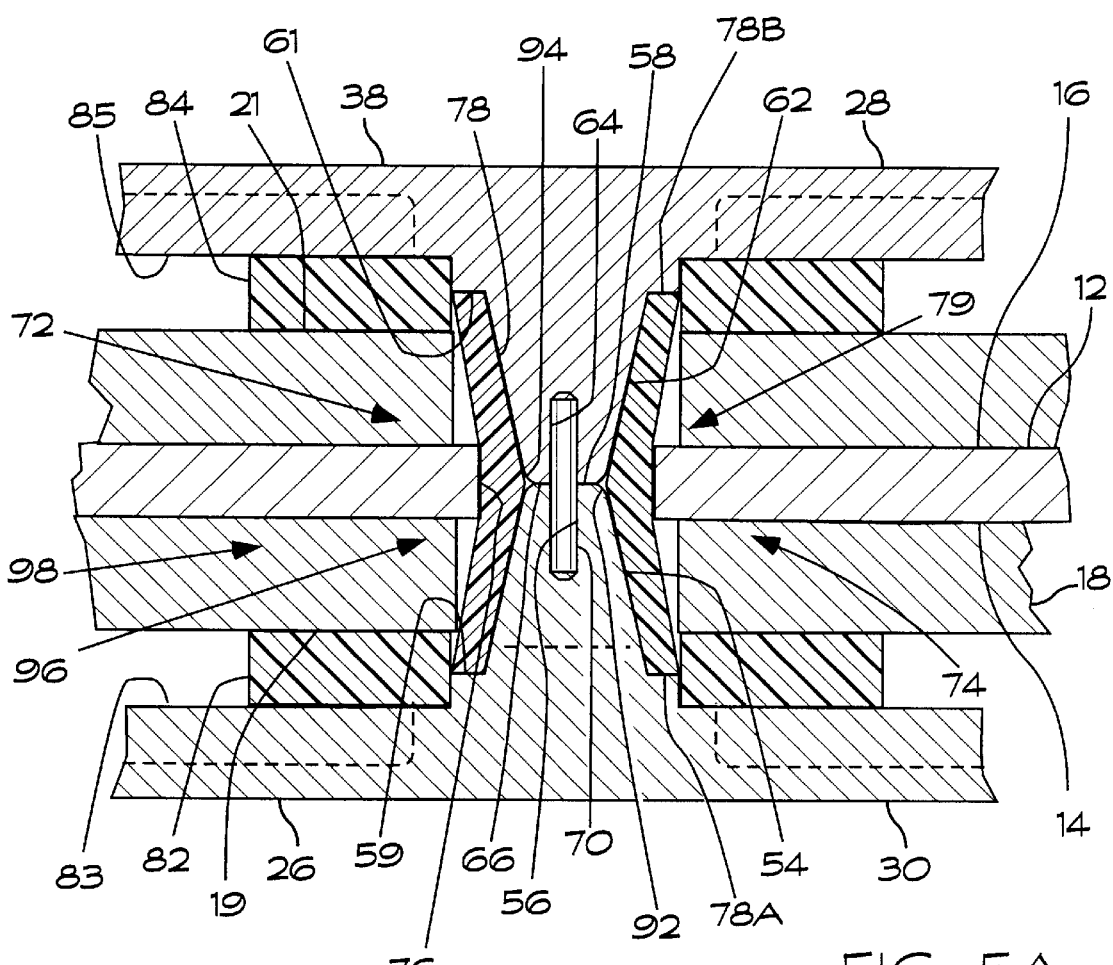
FIG. 5A is an expanded cross sectional view of a portion of the invention as shown in FIG. 4.

The tapered portion 54 of the post 50 may have a curved transition 92 at the end 58 as shown in FIG. 5A. The tapered portion 62 of the post 60 may have a similar curved transition 94 at the end 66. The curved transitions are designed to ensure that a clearance gap exists between the shear damper 78 and the end faces 58 and 66 to prevent pinching of the shear damper 78 at final assembly. The first post 50 and the substantially identical second post 60 are placed in end-to-end alignment with the dowel pin 70 being arranged as described above and shown in FIGS. 3 and 4.

Referring to FIG. 5A, when the first and second posts 50 and 60 are secured together by the dowel pin 70 aided by an interlocking layer of epoxy between the end faces 58 and 66, the steps 59 and 61 in the diameters of the first and second posts 50 and 60 and the tapered end portions 54 and 62 cooperate to form a groove 96 around the support member 72. The groove 96 preferably is formed at a central region 98 of the support member 72 of FIGS. 3 and 4. The shear damper 78 is placed in the groove 96 and constrained against longitudinal movement relative to the support member 72 by the steps 59 and 61.

Although they are described as being separate components of the first housing member 26, the end plate 30, the sidewall 32, the ribs 84A–84H and the post 50 preferably are formed together so the first housing member 26 has a unitary structure. The second housing member 28 preferably is formed in the same manner as the first housing member 26. The housing 24 may be formed of any suitable material, such as plastics or metal, that will allow sufficient structural stiffness to ensure that structural resonance frequencies are far from the acoustic frequency range of interest. In the preferred embodiment, aluminum is used. The housing 24 may be manufactured by any suitable means such as machining or casting.

The first housing member 26 has a series of slots 88A–88H formed in the corresponding ribs 84A–84H. The slots 88A–88H allow the capability of mounting the fiber optic coupler 104 on any two adjacent ribs during final assembly depending on the actual length of fiber remaining following splicing of the four fiber optic leads of the optical coupler 104.

Figure 6:
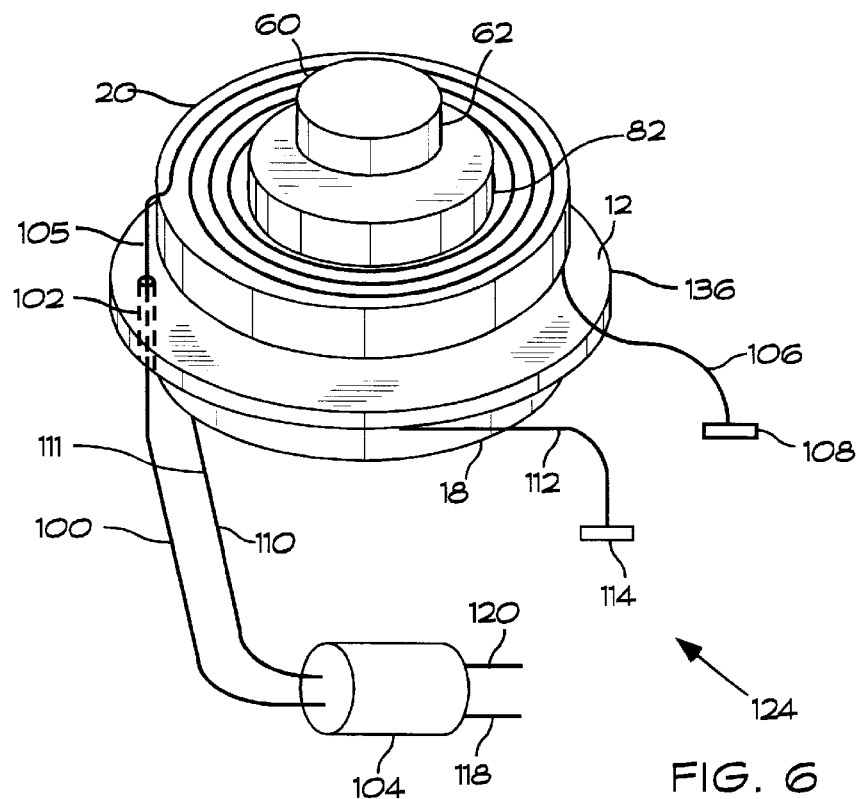
FIG. 6 is a perspective view of a portion of the fiber optic sensor of FIGS. 3 and 4.

The first and second fiber optic coils 18 and 20 are included in an interferometer 124 as shown in FIGS. 3, 6 and 8. As shown in FIGS. 3 and 6, a first fiber optic lead 110 from the optical coupler 104 is connected via suitable splicing (not shown) to an outer edge portion 111 of the first fiber optic coil 18. The optical coupler is preferably a 2×2 optical coupler that is well-known in the art. A second fiber optic lead 112 is routed from the first fiber optic coil 18 to a mirror 114. The second fiber optic lead 112 is connected to an inner end portion (not shown) of the first fiber optic coil 18. A third fiber optic lead 100 from the optical coupler 104 is routed through a passage 102 in the flexural disk 12 and is connected via suitable splicing (not shown) to an outer end portion 105 of the second fiber optic coil 20, and a fourth fiber optic lead 106 is routed from an inner portion (not shown) of the second fiber optic coil 20 to a mirror 108.

Although a simplified direct routing of fibers is shown in FIGS. 3 and 6 for clarity, in standard practice there generally may exist several loops of excess fiber from the fiber optic leads 100 and 110 that need to be contained by a number of retainer tabs 116A–116H (FIGS. 1–3) from arbitrarily contacting the first fiber optic coil 18. The retainer tabs 116A–116H, which generally number between eight and twelve, are spaced equidistantly apart and extend inwardly from an inner wall portion 117 of the first housing member 26.

Although the retainer tabs 116 in FIGS. 1 and 2 are shown staggered between the ribs 84 for the purpose of clarity, in reality the retainer tabs 116 may be located in-line with the ribs for ease of machining. A plan view of the fiber routing is shown in FIG. 1. Excess fiber from the fiber optic leads 118 and 120 may be coiled underneath retainer tabs 116 in a similar manner as described above. The passage 122 is normally sealed around the optical fibers 118 and 120 to prevent the passage of fluids into the housing 24.

Figure 5B:
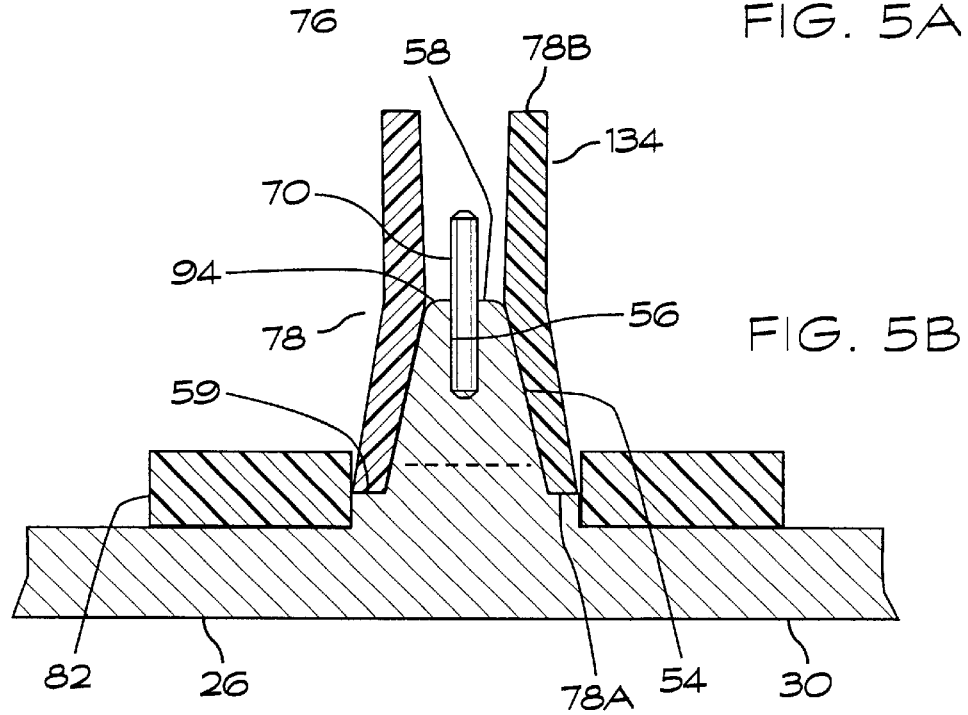
FIG. 5B is a cross sectional view illustrating a step that may be used in assembling the fiber optic sensor according to the invention.

Referring to FIGS. 3, 4, 5A and 5B, assembly of the fiber optic sensor 10 of FIG. 1 includes the step of inserting the dowel pin 70 into the cylindrical recess 56 in the post 50 at this point or at any convenient prior time by a press-fit process that is well known in the art. This is followed by placing the shear damper 78 on the post 50 so that an end 78A is adjacent the step 59. The first compressive damper 80 may then be mounted over the shear damper 78 and placed on top of the ribs 84A–84H of the first housing portion 26. The shear damper 78 is expanded slightly when installed on the post 50 so that the end portion 58 of the post 50 extends to a location near the center of the shear damper 78. This leaves an unexpanded end portion 134 of the shear damper 78 extending away from the end face 58 of the post 50 as shown in FIG. 5B. The unexpanded end portion 134 of the shear damper 78 has an outside diameter smaller than the inside diameter of the central passage 74 of the flexural disk 12. This allows adequate clearance for easy installation of the flexural disk assembly 22 over the end portion 134 of the shear damper 78 and to seat into the slot 35 of the first housing member 26 as shown in FIGS. 3 and 4.

Next, the second compressive damper 82 should be mounted on the post 60 and brought into contact with the ribbed inner surface 85. The second housing member 28 may then be moved into engagement with the first housing member 26 so that the tapered end portion 62 of the post 60 begins to enter the end portion 134 of the shear damper 78 and thus begins to elastically expand it. At the same time, continued insertion using an arbor press (not shown) causes the dowel pin 70 (previously installed in the housing member 26) to enter the cylindrical recess 64 in the post 60 until the end faces 58 and 66 of the posts 50 and 60, respectively, are in contact. An epoxy adhesive may be previously applied to the end faces 58 and 60 to provide and even more robust bond joint when cured. The first and second housing members 26 and 28, respectively, should be arranged so that the outer edge portion 47 of the flexural disk 12 is securely retained between the steps 35 and 42. Forcing the tapered end 62 of the post 60 into the shear damper 78 causes the shear damper 78 to compress axially which, in turn causes radial expansion of the shear damper 78 to bring it into intimate contact with the inner edge potion 76 of the flexural disk. The addition of radiuses 92 and 94 on the first and second posts 50 and 60, respectively, ensures that the radial expansion of the shear damper 78 does not become entrapped between the end faces 58 and 66 when fully seated. The compressive dampers 80 and 82 are compressed between the ribbed inner surfaces 83 and 85, respectively, of the first and second housing portions 26 and 28. An epoxy adhesive may be applied before final assembly to securely bond the outer portion of the flexural disk 12 between the steps 35 and 42 of the first and second housing members 26 and 28, respectively, and to make the housing 24 be impervious to fluids.

The fiber optic sensor 10 according to the present invention may be used as an accelerometer. The fiber optic sensor 10 provides a low-cost device that uses commonly available elastomeric materials with known viscoelastic damping properties in both shear and compression damped configurations. In the fiber optic sensor 10, the shear damper 78 is in contact with the inner edge portion 76 of the flexural disk 12 while the compression dampers 80 and 82 are compressed against the fiber optic coils 18 and 20, respectively. At resonance, the shear damper 78 and the compression dampers 80 and 82 act to dampen extreme motions that high Q (about 45) resonances would otherwise cause in the flexural disk 12 and limit its maximum travel. FIG. 9 graphically illustrates the poorer scale factors of an edge-supported undamped accelerometer (not shown) and a center-supported undamped accelerometer (not shown) compared to the improved scale factor response of the fiber optic sensor 10. The net effect of using the shear damper 78 and the compressive dampers 80 and 82 is a significant increase in the system damping with a corresponding Q reduction down to 6 or less. Such a change in Q provides adequate headroom margin to perform within the acceptable operational band in systems of limited dynamic range that would otherwise be easily overdriven.

The present invention overcomes deficiencies in previous designs that limit the scale factor sensitivity. Previous designs, although based on the minimum scale factor sensitivity required at the time (typically 32 dB re: rad/g), are now not sufficient to meet the minimum sensitivity needed for present applications. The present invention provides a minimum of 8 dB improvement in scale factor sensitivity (40 dB re: rad/g).

The invention has a wider frequency response than previous devices. The new design sensor according to the invention features an extended frequency response over 10.0 kHz, which compares with an earlier upper frequency limit of 8.3 kHz typical of earlier designs. The advantage of shifting the resonant frequency upward is to ensure that a minimal phase change of the sensor response exists between the upper and lower limits of the operational passband, which inherently improves sensor-to-sensor repeatability.

Because all sensors of this type inherently consist of a spring-mass system, they have, by nature, a natural resonance. The peak of this resonance is governed by the amount of damping present in the instrument. Low damping creates sharp resonance peaks that reduce the dynamic range headroom available in the system. The present invention utilizes the combination of the compressive viscoelastic dampers 80 and 82 that works in combination with the shear damper 78 to reduce the quality factor Q from typically around 45 to a value of 6 or less. The compressive dampers 80 and 82 may be formed of a commonly available and inexpensive material called Sorbothane® that can easily be cut to size using a standard cutting die. The shear damper 78 can be easily fabricated out of low cost nitrile, polyurethane, or silicone rubber tubing and eliminates the need for a separate and expensive molding operation.

Earlier designs for forming fiber optic coils required a separate wet wind, initial cure, removal, application of a bonding adhesive, and fixturing to mount and preload the coil on the flex disk during final cure. The new sensor design allows direct wet winding of the fiber optic coils 18 and 20 on the flexural disk 12 with a winding fixture that can be immediately placed in a cure oven, thereby eliminating several intervening steps. An additional benefit is that a direct wind eliminates or reduces the bondline thickness between the fiber coils 18 and 20 and the flexural disk 12 that typically results from a separate bonding operation. Computer modeling has shown that an excessively thick bondline can result in several dB loss of sensitivity by allowing acceleration strain to be transferred to the compliant adhesive layer instead of directly to the fiber optic coils 18 and 20.

As shown in FIG. 3, this invention incorporates the elongated passage 102 in the flexural disk 12 to allow easy passage of the fiber 100 from the side 16 of the flexural disk 12 to the opposite side 14 for splicing to the optical coupler 104 located there. In the past, fiber from an edge-support flex disk design had to be routed through a center hole in a relatively uncontrolled manner that is subject to sharp bending and rubbing against the edge hole. The improved design incorporates the chamfered passage 102 whose length is sufficient enough to allow gradual fiber bending in the transition region between the first and second sides of the flexural disk, resulting in reduced fiber breakage and increased reliability.

This improved design departs from the earlier convention of using a center supported flex disk configuration for acoustic sensing. As the sensor flexural disk size is increased to accommodate a greater amount of fiber, the natural resonant frequency ($F_N$) of the sensor drops. To recover the loss in $F_N$ and to further increase it for performance reasons, the flexural disk thickness needs to be increased substantially to obtain the required flexural stiffness. The heavier flex disk unfortunately requires a correspondingly lighter housing to maintain overall neutral buoyancy, which, in turn, can allow undesirable case resonances to occur within the operational bandwidth of the sensor. The use of the edge support configuration of the present invention minimizes these effects by virtue of its inherently high natural flex disk resonance frequency and housing stiffness compared to center support designs.

To further shift housing resonances even farther away from the operational frequency range of interest, this invention incorporates the stiffening central support 72 in the center of the housing 24 to create a beneficial structural node where no housing deflections can occur. This action effectively shifts the first natural resonant mode into a higher-level mode (e.g. four or five) that resides well outside the band of interest. To minimize cost and allow ease of assembly, the simple press-fit steel dowel pin 70 is used to mechanically align and lock both housing portions 26 and 28 together in this manner. This central support 72 structure also has an additional benefit of providing a mounting surface for the shear damper 78 as shown in FIGS. 5A and 5B.

The inclusion of ribbed inner surfaces 83 and 85 in the housing base plates 30 and 38, respectively, solves several problems inherent in earlier designs. The first problem is the possible presence of the lower housing resonance modes residing within the operational frequency range of the sensor 10. The ribbed inner end surfaces 83 and 85 in the invention provide the necessary sidewall and base plate stiffness to shift any potentially interfering structural resonances to frequencies well outside the sensor's operational bandwidth in a similar manner as performed by the central support 72. The second problem of concern is the inherent pressure sensitivity typical of edge-supported sensors. Because of the inherent rigidity and symmetry in rib design between the first and second housings 26 and 28, respectively, the possible occurrence of pressure sensitivity resulting from asymmetrical deflection of the flexural disk 12 is thereby greatly diminished. The third problem is to ensure that the sensor 10 remains neutrally buoyant with respect to the density of an outer decoupler (such as nitrile or NGD-9) for optimal transmission of acoustic signals. Including the ribbed inner surfaces 83 and 85 reduces the sensor weight to an amount that permits the sensor 10 to effectively match the density of the surrounding outer decoupler material without the need of any external flotation device. Prior art sensors typically require the fabrication and installation of an additional cost two-piece flotation collar made from low-density syntactic foam to achieve neutral buoyancy. Also, the addition of the ribs provides a convenient platform for positioning and installing the compressive dampers 80 and 82 mentioned earlier.

The present invention also incorporates eight integrally machined fiber-holding tabs 116A–116H designed to hold excess fiber in place during coupler installation and final sensor assembly. Previous designs required the spot tacking of fiber directly to the housing floor, which prevents later redressing of the fiber leads if needed.

The new design also incorporates the groove cutouts 88A–88H in the lower housing ribs 84A–84H, respectively, to precisely locate the coupler 104 for proper placement and allow direct bonding on top of the appropriate rib pair selected at final assembly with cyanoacrylate adhesive. By locating the coupler 104 near the outer wall 32 of the housing portion 26 instead of in the center, the need to machine a coupler through-hole mount into the center post (as done on earlier designs) has been eliminated, as well as simplifying the fiber routing.

The base plates 30 and 38 have thicknesses that have been carefully selected to permit adequate bulk modulus compliance designed to match or closely approximate that of seawater for optimal acoustic transmissivity. The thickness is adequate to ensure that its intrinsic resonance modes are sufficiently high to ensure non-interaction within the operational band of interest while at the same time, provide a degree of compliance to simulate the compressibility characteristics of seawater and outer decoupler materials.

The new sensor design can easily accommodate special gel-filled fiber optic tubes designed to prevent possible fiber damage and breakage at maximum operating depths. A machined through-hole raised above the lower housing floor bottom between two ribs will allow a minimal amount of potting material to be added in one of the pie-shaped sectors effectively encapsulating the fiber tube completely and creating a hermetic seal against external leakage. This configuration provides a very robust method of sealing compared to previous designs.

Figure 7:
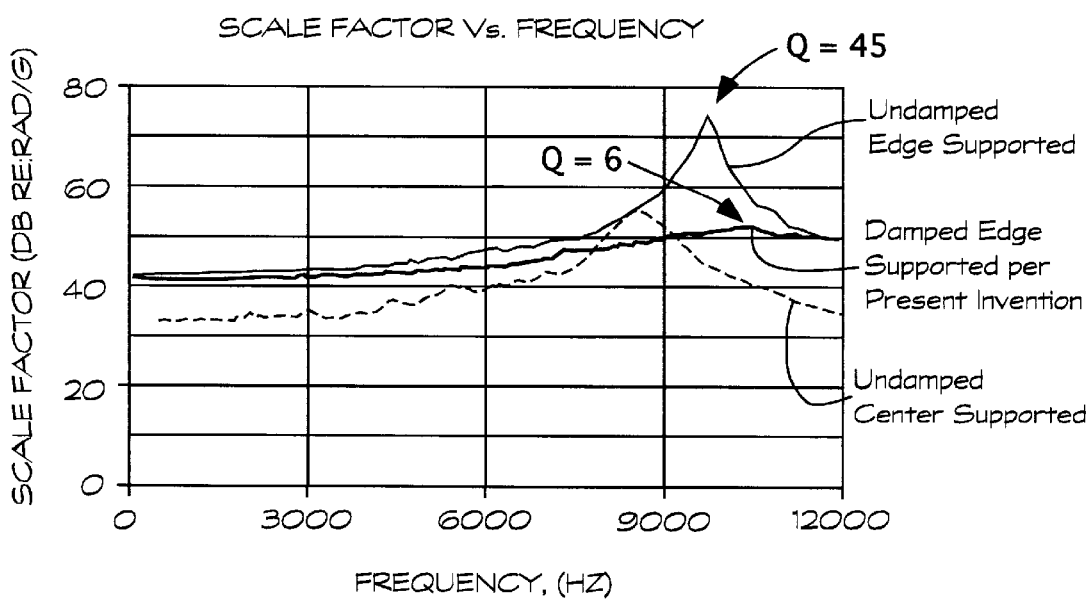
FIG. 7 graphically illustrates the flatter frequency response of a sensor according to the present invention compared to the frequency response of the same sensor without damping and to the frequency response of a typical undamped center-support sensor representative of the prior art.

FIG. 7 illustrates the experimental data validating improvements achieved with the present invention. The scale factor (sensitivity) of an undamped center-supported fiber optic accelerometer is shown as a function of acoustic input frequency. The scale factor performance of an undamped edge-supported sensor of a design similar to the present invention is also shown. Both the magnitude and resonance frequency (directly related to bandwidth) are improved over the center-supported sensor that is representative of the prior art. FIG. 9 also shows the scale factor performance of the damped edge-supported sensor according to the invention. Of note is the reduced Q of the resonance peak, yet both wide bandwidth and high scale factor were preserved.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A fiber optic sensor that includes a flexural disk having a pair of fiber optic coils mounted on opposite sides thereof and optically coupled together to form an interferometer that produces an output signal in response to acceleration of the flexural disk, comprising:
   a housing having first and second end plates with a sidewall extending therebetween, the sidewall having an inwardly facing groove therein, the flexural disk having an outer edge portion mounted in the inwardly facing groove;
   a compressive damper mounted in the housing and arranged to exert a compressive force on the flexural disk to control movement thereof in response to acceleration of the flexural disk along a sensing axis and thereby control the output signal amplitude over a selected operational frequency range, wherein the compressive damper comprises:
      a first compressive damping member mounted between a first side of the flexural disk and the first end plate; and
      a second compressive damping member mounted between a second side of the flexural disk and the second end plate.

2. The fiber optic sensor of claim 1, further comprising a support member extending between oppositely facing portions of the first and second end plates, wherein each of the first and second compressive damping members comprises a cylinder formed of a viscoelastic material having a central passage therein, the first and second damping members being mounted in the housing such that the support member extends through the central passages in the first and second compressive damping members.

3. A fiber optic sensor that includes a flexural disk having a pair of fiber optic coils mounted on opposite sides thereof and optically coupled together to form an interferometer that produces an output signal in response to acceleration of the flexural disk, comprising:
   a housing having first and second end plates with a sidewall extending therebetween, the sidewall having an inwardly facing groove therein, the flexural disk having an outer edge portion mounted in the inwardly facing groove wherein each of the end plates has ribbed inner surfaces with a plurality of ribs extending away from the end plates inward in the housing; and
   a compressive damper mounted in the housing and arranged to exert a compressive force on the flexural disk to control movement thereof in response to acceleration of the flexural disk along a sensing axis and thereby control the output signal amplitude over a selected operational frequency range.

4. The fiber optic sensor of claim 3 wherein the ribs provide stiffening such that resonance of the housing is greater than the selected operational frequency range.

5. The fiber optic sensor of claim 4 wherein the ribbed inner surfaces of the end plates provide the housing with a mass that enables the fiber optic sensor to be neutrally buoyant in water.

6. The fiber optic sensor of claim 3 wherein the plurality of ribs are arranged to axially compress the compressive damper.

7. The fiber optic sensor of claim 3 wherein the ribs extend radially between the support member and the sidewall of the housing.

8. The fiber optic sensor of claim 3, further including an optical coupler connected to the first and second fiber optic coils and wherein an adjacent pair of ribs in the first end plate has slots formed therein for mounting the optical coupler in the housing.

9. The fiber optic sensor of claim 8, further comprising a plurality of routing tabs extending inward from the sidewall for retaining optical fibers in selected positions in the housing.

10. The fiber optic sensor of claim 2 wherein the flexural disk includes a central passage therethrough, the central support extending through the central passage in the flexural disk with an inner edge of the central passage in the flexural disk being spaced apart from the support member, further comprising a shear damper mounted on the central support member and arranged to exert a radial force on the inner edge of the flexural disk to dampen vibrations of the flexural member and thereby further control the output signal amplitude over a selected frequency range.

11. The fiber optic sensor of claim 10, wherein the support member is formed to have a pair of base portions connected to the first and second end plates, the shear damper being mounted at a central region of the support member between the base portions and being restrained against lengthwise motion relative to the support member.

12. The fiber optic sensor of claim 9 wherein the support member is formed to have a circumference that increases lengthwise away from the central region, the damping member comprising a length of tubing formed of a viscoelastic material, the damping member being mounted on the support member at the central region and restrained against movement away from the central region by elastic forces caused by the increasing circumference of the support member away from the central region.

13. The fiber optic sensor of claim 11 wherein the base potions are generally cylindrical and the central region is formed as a groove having a pair of edges defined by a pair of spaced-apart diameter steps in the support member and wherein the shear damper has a pair of end portions that abut the edges of the groove such that the shear damper is retained within the groove.

14. The fiber optic sensor of claim 13 wherein the damping member is formed of a viscoelastic material and wherein the damping member is axially compressed between the edges of the groove such that the damping member is expanded radially and forced against the inner edge portion of the flexural disk.

15. A fiber optic sensor that includes a flexural disk having a pair of fiber optic coils mounted on opposite sides thereof and optically coupled together to form an interferometer that produces an output signal in response to acceleration of the flexural disk, comprising:

a housing having first and second end plates with a sidewall extending therebetween, the sidewall having an inwardly facing groove therein, the flexural disk having an outer edge portion mounted in the inwardly facing groove;

a compressive damper mounted in the housing and arranged to exert a compressive force on the flexural disk to control movement thereof in response to acceleration of the flexural disk along a sensing axis and thereby control the output signal amplitude over a selected operational frequency range, and wherein the housing includes:

a first housing member that includes the first end plate, a first sidewall portion extending from an outer edge of the first end plate, and a first post extending from a central region of the first end plate; and a second housing member that includes the second end plate, a second sidewall portion extending from an outer edge of the second end plate and a second post extending from the second end plate, the first and second sidewall portions each having inwardly facing notches at end edges thereof, the first and second housing members being arranged end-to-end such that the inwardly facing notches define the inwardly-facing groove in which the outer edge of the flexural disk is mounted and such that the first and second posts are aligned end-to-end to define the support member.

16. A method for forming a fiber optic sensor that includes a flexural disk having a pair of fiber optic coils mounted on opposite sides thereof and optically coupled together to form an interferometer that produces an output signal in response to acceleration of the flexural disk, comprising the steps of:

forming a housing to have first and second end plates with a sidewall extending therebetween, the sidewall being formed to have an inwardly facing groove therein;

mounting the flexural disk in the inwardly facing groove;

mounting a compressive damper in the housing;

arranging the compressive damper to exert a compressive force on the flexural disk to control movement thereof in response to acceleration of the flexural disk along a sensing axis and thereby control the output signal amplitude, wherein the step of mounting a compressive damper in the housing comprises the steps of:

mounting a first compressive damping member between a first side of the flexural disk and the first end plate; and mounting a second compressive damping member between a second side of the flexural disk and the second end plate.

17. The method of claim 16 including the steps of:

forming a support member that extends between oppositely facing portions of the first and second end plates;

forming each of the first and second compressive damping members to comprise a cylinder formed of a viscoelastic material having a central passage therein; and mounting the first and second damping members in the housing such that the support member extends through the central passages in the first and second compressive damping members.

18. A method for forming a fiber optic sensor that includes a flexural disk having a pair of fiber optic coils mounted on opposite sides thereof and optically coupled together to form an interferometer that produces an output signal in response to acceleration of the flexural disk, comprising the steps of:

forming a housing to have first and second end plates with a sidewall extending therebetween, the sidewall being formed to have an inwardly facing groove therein;

forming each of the end plates to have ribbed inner surfaces with a plurality of ribs extending away from the end plates inward in the housing;

mounting the flexural disk in the inwardly facing groove;

mounting a compressive damper in the housing; and arranging the compressive damper to exert a compressive force on the flexural disk to control movement thereof in response to acceleration of the flexural disk along a sensing axis and thereby control the output signal amplitude.

19. The method of claim 18 including the step of arranging the ribs to provide stiffening such that resonance of the housing is greater than the selected operational frequency range.

20. The method of claim 19 including the step of forming the ribbed inner surfaces of the end plates to provide the housing with a mass that enables the fiber optic sensor to be neutrally buoyant in water.

21. The fiber optic sensor of claim 18 including the step of arranging the plurality of ribs to axially compress the first and second compressive damping members.

22. The method of claim 21 including the step of arranging the ribs to extend radially between the support member and the sidewall of the housing.

23. The method of claim 22, further including the steps of:

connecting an optical coupler to the first and second fiber optic coils; and forming slots in an adjacent pair of ribs in the first end plate for mounting the optical coupler in the housing.

24. The method of claim 23, further comprising the step of providing a plurality of routing tabs that extend inward from the sidewall for retaining optical fibers in selected positions in the housing.

25. The method of claim 24 including the steps of:

forming the base portions to be generally cylindrical;

forming the central region as a groove having a pair of edges defined by a pair of spaced-apart diameter steps in the support member; and arranging end portions of the shear damper to abut the end edges of the groove such that the shear damper is retained within the groove.

26. The method of claim 25 including the steps of:

forming the shear damper to comprise a viscoelastic material; and axially compressing the shear damper between the end edges of the groove such that the damping member is expanded radially and forced against the inner edge portion of the flexural disk.

27. A method for forming a fiber optic sensor that includes a flexural disk having a pair of fiber optic coils mounted on opposite sides thereof and optically coupled together to form an interferometer that produces an output signal in response to acceleration of the flexural disk, comprising the steps of:

forming a housing to have first and second end plates with a sidewall extending therebetween, the sidewall being formed to have an inwardly facing groove therein;

forming a first housing member that includes the first end plate, a first sidewall portion extending from an outer edge of the first end plate and a first post extending from a central region of the first end plate;

forming a second housing member that includes the second end plate, a second sidewall portion extending from an outer edge of the second end plate and a second post extending from the second end plate;

forming the first and second sidewall portions to each have inwardly facing notches at end edges thereof; and arranging the first and second housing members end-to-end such that the inwardly facing notches define an inwardly-facing groove, the first and second posts, being aligned end-to-end to define the support member;

mounting the flexural disk in the inwardly facing groove;

mounting a compressive damper in the housing; and arranging the compressive damper to exert a compressive force on the flexural disk to control movement thereof in response to acceleration of the flexural disk along a sensing axis and thereby control the output signal amplitude.

* * * * *